Dec. 10, 1935.  L. MARTINAGE  2,023,737
ENDLESS TRACK VEHICLE
Filed June 18, 1931  2 Sheets-Sheet 1
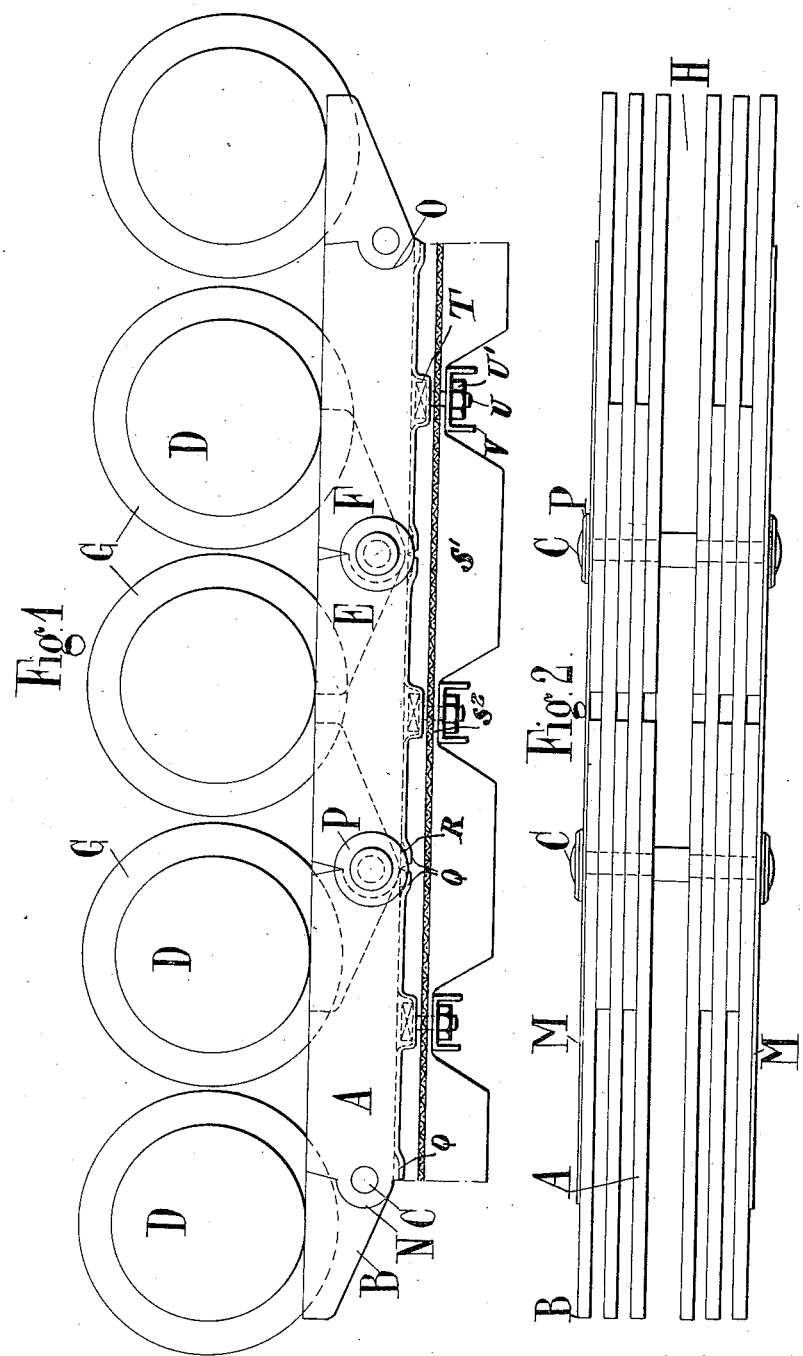
L. Martinage
INVENTOR
By: Marks & Clerk
ATTYS.

Dec. 10, 1935.  L. MARTINAGE  2,023,737
ENDLESS TRACK VEHICLE
Filed June 18, 1931  2 Sheets-Sheet 2
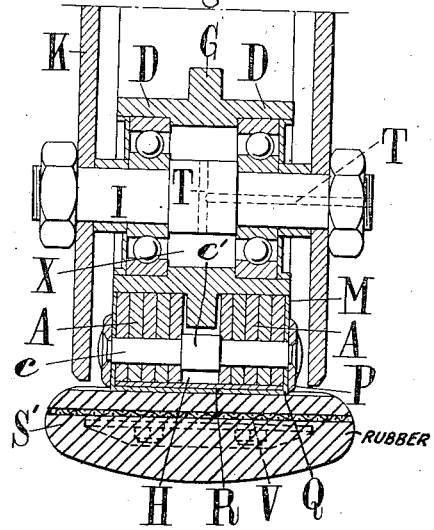
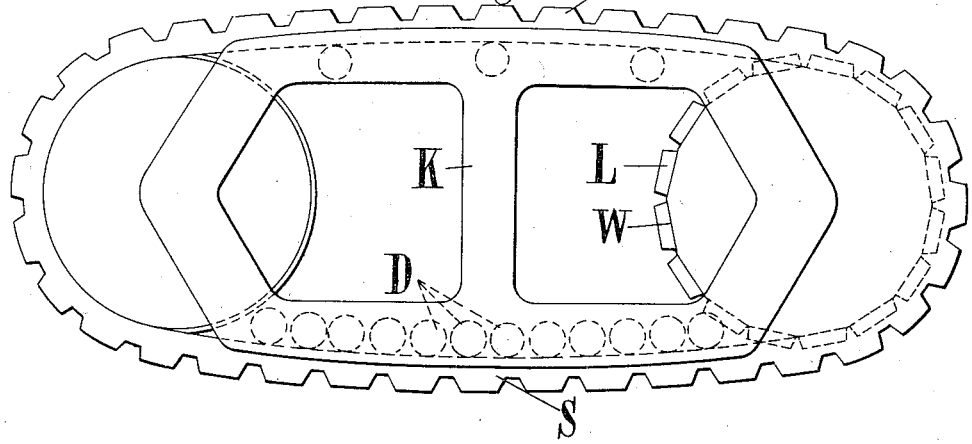
L. Martinage
INVENTOR
By Marks & Clerk
Attys.

Patented Dec. 10, 1935

2,023,737

UNITED STATES PATENT OFFICE 2,023,737

ENDLESS TRACK VEHICLE

Léon Martinage, Paris, France

Application June 18, 1931, Serial No. 545,338
In France June 21, 1930

1 Claim. (Cl. 305—10)

This invention relates to endless track vehicles and has for its object to devise improvements in the construction and arrangement of the endless track which will make for simplicity and increased efficiency.

The invention is applicable to every kind of vehicle, including aircraft, carriages, tanks, wheelbarrows and mechanical transporters and in general to any vehicle for mechanical or animal traction.

In the present-day devices with chain flexible in one direction and rigid in the other, the rigidity of the chain would enable greater speeds to be realized than with the flexible track that adapts itself to all the irregularities of the ground, but a so-called rigid chain is a very complicated device, giving rise to an excessive amount of friction and comprising delicate parts, which soon limit its speed of operation and its useful life.

As will be seen from what follows, the device forming the subject of the present invention, while retaining the principle of rigidity, eliminates all the delicate parts, since the chain itself is as simple and as flexible as an ordinary bicycle chain, and its momentary rigidity is only given to it by the manner in which it bears upon its roller train.

Finally, from the constructional point of view, the chain comprises only one kind of link, which is a great simplification.

The roller band forming the subject of the invention is illustrated by way of example in the accompanying drawings, in which:—

Figure 1 is a side elevation of a portion of the endless track and load supporting rollers in operative position, Figure 2 is an inner plan view of a portion of the endless track, Figure 3 is a cross section of the structure shown in Figure 4, Figure 4 is a diagrammatic view in side elevation on a smaller scale, showing the general arrangement of the track system.

The chain in accordance with the invention is composed of links A, all identical and each having means by which the links may be connected together by two pivots C. The links are prolonged beyond the pivots by lugs B, the depth of which decreases from the neighbourhood of the pivots towards the ends, and the length of which is substantially equal to half the pitch of the chain.

These links, by their pivots, are linked together in the ordinary way to form chain elements, and the construction of the whole is that of an ordinary chain.

These links may be coupled together in lateral pairs, or any other desired numbers may be employed, the links all having their faces flush so as to lie in the same plane.

Since adjacent links all overlap one another at their ends, a continuous surface is obtained, which constitutes the rolling path of the rollers, and if it be desired to make two or more rollers roll side by side, whether mounted on the same pivot or not, the breadth of the chain is increased by as many rolling tracks as are necessary.

The rolling train is composed of rollers D mounted or not on ball bearings. The spacing of the pivots of the rollers is such that the distance between their pivots is considerably less than the length of a link, so that the lugs of two front and back links, E and F for example, are supported by two consecutive rollers, and any one link will always be supported by at least two rollers and will not be able to rock.

The guiding of the chain is effected by an annular rib G on each of the rollers D, which lodges in the space H between two roller paths.

The fixed pivots I of the rollers D are carried by a rigid frame K, which may be of elliptical, elongated, circular, or other form and which gives the roller train a straight or circular form.

When it is desired that the chain shall be positively driven the connecting pivots C of the links may be provided between two roller paths with a central shoulder C', with or without a roller, which will serve at the same time as a strut for the two roller paths and will mesh with a sprocket pinion L driven by the motor, and will thus effect the drive of the chain.

In order to effect good guidance of the chain by means of the sprocket wheel the bearing surface of the rim of this wheel may carry elements W, which conform to the shape of the backs of the links.

The upper run of the chain will be supported by return rollers identical with the rollers D.

At one end (for example at the end remote from the driving wheel) the chain passes round a return loose pulley.

In order to protect the chain it may be mounted inside covers M of flanged and non-oxidizable sheet metal, which will form a trough serving to retain to a certain extent lubricating oil or grease between the links. The joints of the covers on the lateral faces are formed by male and female circular flanges N and O, and are protected by a washer P; in the bottom of the trough the joints are formed by two small flanges Q, in which there lodges a closure plate R.

The lubrication of the whole is effected:—

For the rollers, by an oil chamber X formed between the two ball bearings and supplied from the outside by the bored ducts T;

The chain will carry a suitable tire. In the example illustrated there is provided a continuous tire S of rubber (Figure 4) having shoes $S^1$ (Figure 1), the tire being connected to the cover plates M by means of bolts U, which pass through portions $S^2$ of the tire (said portions $S^2$ connecting adjacent shoes $S^1$), the cover plates M having sockets T, in which heads side bolts are received, flanged plates V being also provided, and clamped against the outer surfaces of the portions $S^2$ of the tire by nuts $U^1$ on said bolts.

Having now described my invention, what I claim as new and desire to secure by Letters Patent is:—

An endless track for vehicles comprising in combination a chain formed of two sets of links, each set including a plurality of links side by side, the opposite links in both sets having common pivots, each pivot having an enlarged portion to separate the sets, side covers for the outer portion of each set of links, closure plates extending under both sets of links from cover to cover, a tire extending under both sets of links and secured to the closure plates and shoes secured to the tire.

LÉON MARTINAGE.